(12) United States Patent
Buckett et al.

(10) Patent No.: US 8,461,070 B2
(45) Date of Patent: Jun. 11, 2013

(54) GLASS COMPOSITION

(75) Inventors: John Buckett, High Legh (GB); Keith Haughey, Liverpool (GB); Neil McSporran, Liverpool (GB)

(73) Assignee: Pilkington Group Limited, St. Helens, Merseyside (GB)

( * ) Notice: Subject to any disclaimer, the term of this patent is extended or adjusted under 35 U.S.C. 154(b) by 367 days.

(21) Appl. No.: 12/450,385

(22) PCT Filed: Mar. 20, 2008

(86) PCT No.: PCT/GB2008/050208
§ 371 (c)(1),
(2), (4) Date: Sep. 23, 2009

(87) PCT Pub. No.: WO2008/117088
PCT Pub. Date: Oct. 2, 2008

(65) Prior Publication Data
US 2010/0040812 A1 Feb. 18, 2010

(30) Foreign Application Priority Data

Mar. 28, 2007 (GB) .................................. 0705894.4
Jul. 25, 2007 (GB) .................................. 0714498.3

(51) Int. Cl.
*C03C 3/085* (2006.01)
*C03C 3/087* (2006.01)

(52) U.S. Cl.
USPC ............... 501/69; 501/70; 501/71; 52/204.5; 428/426

(58) Field of Classification Search
USPC ........... 501/68, 69, 70, 71; 52/204.5; 428/426
See application file for complete search history.

(56) References Cited

U.S. PATENT DOCUMENTS

| | | | |
|---|---|---|---|
| 4,277,285 A | 7/1981 | Boudot et al. | |
| 4,376,829 A | 3/1983 | Daiku | |
| 5,214,008 A | 5/1993 | Beckwith et al. | |
| 5,240,886 A | 8/1993 | Gulotta et al. | |
| 5,656,559 A | 8/1997 | Combes et al. | |
| 5,700,579 A | 12/1997 | Jeanvoine et al. | |
| 5,817,587 A | 10/1998 | Jeanvoine et al. | |
| 5,830,814 A | 11/1998 | Combes | |
| 5,837,629 A | 11/1998 | Combes et al. | |
| 5,994,249 A * | 11/1999 | Graber et al. ................... | 501/71 |
| 6,048,812 A * | 4/2000 | Brocheton et al. ............. | 501/57 |
| 6,133,179 A | 10/2000 | Bertherau | |
| RE37,328 E | 8/2001 | Pecoraro et al. | |
| 6,335,300 B1 | 1/2002 | Bordeaux et al. | |
| 6,460,376 B1 | 10/2002 | Jeanvoine et al. | |
| 6,506,700 B1 | 1/2003 | Combes et al. | |
| 6,524,685 B1 | 2/2003 | Torr et al. | |
| 6,551,953 B1 | 4/2003 | Gulotta et al. | |
| 6,589,897 B1 | 7/2003 | Foguenne | |
| 6,612,133 B2 | 9/2003 | Sakaguchi et al. | |
| 6,713,180 B1 | 3/2004 | Torr et al. | |
| 6,727,198 B1 * | 4/2004 | Hashimoto et al. ............. | 501/66 |
| 6,739,152 B2 | 5/2004 | Jeanvoine et al. | |
| 6,744,207 B2 * | 6/2004 | Ulenaers et al. ............... | 313/636 |
| 6,790,799 B2 * | 9/2004 | Kuroki et al. .................... | 501/64 |
| 6,797,658 B2 | 9/2004 | Pecoraro et al. | |
| 6,858,553 B2 * | 2/2005 | Seto et al. ........................ | 501/70 |
| 7,026,753 B2 * | 4/2006 | Futagami et al. ............. | 313/493 |
| 7,153,798 B2 | 12/2006 | Bordeaux et al. | |
| 7,598,190 B2 | 10/2009 | Taguchi et al. | |
| 7,611,773 B2 | 11/2009 | Seto et al. | |
| 7,624,595 B2 | 12/2009 | Jeanvoine et al. | |
| 7,632,767 B2 | 12/2009 | Nagashima et al. | |
| 7,682,999 B2 * | 3/2010 | Teyssedre ...................... | 501/64 |
| 7,772,144 B2 | 8/2010 | Landa et al. | |
| 2002/0068678 A1 | 6/2002 | Seto et al. | |
| 2003/0220183 A1 * | 11/2003 | Kurachi et al. .................. | 501/70 |
| 2004/0067835 A1 * | 4/2004 | Seto et al. ........................ | 501/64 |
| 2006/0006786 A1 * | 1/2006 | Fechner et al. ............... | 313/493 |
| 2006/0158121 A1 * | 7/2006 | Neelen et al. ................. | 313/639 |
| 2007/0032368 A1 | 2/2007 | Landa et al. | |
| 2010/0216624 A1 * | 8/2010 | Sawa et al. ..................... | 501/13 |

FOREIGN PATENT DOCUMENTS

| | | |
|---|---|---|
| EP | 0297404 A1 | 1/1989 |
| EP | 0791563 A1 | 8/1997 |

(Continued)

OTHER PUBLICATIONS

Machine Translation of JP 2003-171141 A, Jun. 17, 2003.*
Fox et al., Transition metal ions in silicate melts, Physics and Chemistry of Glasses, 1982, pp. 169-178., v. 23.
Sakaguchi, Effect of heat treatment on optical absorption of iron in float glass, Glass Technology, 2002, pp. 245-247, v. 43C.
Duffy and Ingram, Establishment of an optical scale for Lewis basicity in inorganic oxyacids, molten salts and glasses, J. Am. Chem. Soc., 1971, pp. 6448-6454, v. 93:24.
Danielson and Schreurs, Optical and EPR absorptions of iron in alkaline earth aluminosilicate glasses, J. Non-Crystalline Solids, 1980, pp. 177-182, v. 38 & 39.
Combes et al., Influence of field strength parameters on the optical spectra of iron-coating silicate glasses, 17th Int. Congress Glass, 1995, pp. 90-94.
Sakaguchi and Uchino, Compositional dependence of infrared absorption of iron-doped silicate glasses, J. Non-Crystalline Solids, 2007, pp. 4753-4761, v. 353.

*Primary Examiner* — Karl Group
*Assistant Examiner* — Elizabeth A Bolden
(74) *Attorney, Agent, or Firm* — Marshall & Melhorn, LLC

(57) ABSTRACT

Flat glass composition comprising the following (expressed as percentages by weight): $SiO_2$ 60 75%; $Al_2O_3$ 0 5%; $Na_2O$ 10 18%; $K_2O$ 0 5.5%; CaO 0 5%; MgO 0-2%; $SO_3$ 0 1%; $Fe_2O_3$ (total iron)>0.01%; $TiO_2$ 0-1% and one or both of: SrO 0-15%; BaO 0-15% with the proviso that the summed amount of SrO and BaO is greater than 4%. A preferred composition comprises: $SiO_2$ 65-74%; $Al_2O_3$ 0-3%; $Na_2O$ 13 16%; $K_2O$ 0-2%; CaO 1-4.9%; MgO 0-2%; $SO_3$ 0-1%; $Fe_2O_3$ (total iron)>0.01%; $TiO_2$ 0 1%; BaO 4-10%; SrO 0-5%, wherein the summed amount of the alkaline earth metal constituents is in the range 10-13% and the summed amount of the alkali metal constituents is in the range 14-16%. The ferrous level of the glass may be greater than or equal to 28%, its performance in a thickness of 5 mm or less may be greater than or equal to 29 at $LT_A \geq 70\%$, and greater than or equal to 27 at $LT_A \geq 75\%$, and its liquidus temperature may be less than or equal to 980° C.

21 Claims, No Drawings

| | FOREIGN PATENT DOCUMENTS | | |
|---|---|---|---|
| EP | 1067098 A | | 1/2001 |
| FR | 2881739 A1 * | | 8/2006 |
| GB | 1398125 | | 6/1975 |
| GB | 2315265 A | | 1/1998 |
| JP | 60 215546 A | | 10/1985 |
| JP | 1988-147843 A | | 6/1988 |
| JP | 1992-187539 A | | 7/1992 |
| JP | 1994-092677 A | | 4/1994 |
| JP | 06092677 A | * | 4/1994 |
| JP | 2003 171141 A | | 6/2003 |
| RU | 2194674 C2 | | 7/2002 |
| SU | 555061 A1 | | 4/1977 |
| SU | 1661155 A1 | | 7/1991 |
| SU | 1721031 A1 | | 3/1992 |
| SU | 1747408 A1 | | 7/1992 |
| WO | 94/14716 | | 7/1994 |
| WO | WO 2005033031 A1 * | | 4/2005 |
| WO | 2006/110131 A1 | | 10/2006 |
| WO | WO 2007007651 A1 * | | 1/2007 |

* cited by examiner

GLASS COMPOSITION

BACKGROUND OF THE INVENTION

The present invention relates to a glass composition suitable for making glass, especially flat glass, that exhibits high visible light transmission and low heat transmission.

Use of glass to glaze vehicles and buildings is currently on the increase as the desire and demand for more visible light in enclosed spaces increases. However this is alongside more stringent demands in terms of energy efficiency, for example to reduce the load on air-conditioning systems in vehicles and buildings and providing lighter-weight glazings for vehicles. A number of avenues have been explored to create glazings that meet these so-called "high performance" requirements of high light transmission and low heat transmission; many of the solutions proposed to date focus on laminated glazings (i.e. glazings comprising two or more panes of glazing material joined together by an interlayer ply extending between each).

One way is to provide a laminate with a solar control coating (often silver-based) that permits transmission of visible light whilst preferentially reflecting infrared radiation. Another option is to use a specialist interlayer material, such as a specialist polyvinyl butyral, that has been specifically designed to maximise light transmission and minimise heat transmission through it. Unfortunately such solutions are relatively expensive to provide, and in the case of deposition of a coating on a substrate, result in the introduction of a further processing step. Furthermore, such solutions are not applicable to monoliths (i.e. single panes of glass).

It has therefore been a task for the glass industry over recent years to design and manufacture glasses that in themselves have high visible light transmission (i.e. greater than 70% when measured with CIE Illuminant A) and low direct solar heat transmission (i.e. less than 50% when measured according to ISO 9050; Air Mass 1.5) at least one thickness in the range 1 mm to 10 mm. Such glasses should be useful as monoliths and when incorporated into laminates and multiple pane glazing units (i.e. glazings having two or more panes of glass separated by a gaseous layer in a sealed space between each).

As a starting point, clear flat glass, especially clear float glass, is typically made using the batch ingredients sand, soda ash, limestone, dolomite, saltcake and cullet, which may result in a glass containing for example 70-73% $SiO_2$, 12-14% $Na_2O$, 7.5-10% CaO, 3-5% MgO, 0-2% $Al_2O_3$, 0-1% $K_2O$, 0-0.3% $SO_3$ and 0.07-0.13% $Fe_2O_3$ (total iron) which will ordinarily be present in both its oxidised Fe(III) and reduced Fe(II) form, and having a light transmission of around 89% and a direct solar heat transmission of around 83%, both at 3.85 mm.

There have been many suggestions and proposals for how to achieve high performance glasses by modification of typical flat glass compositions. Broadly speaking, these solutions fall into one of two general categories. On the one hand, it has been suggested that to improve the infrared absorption of a glass (to reduce its heat transmission), the total iron content of the glass should be increased. For a given ferrous ratio (i.e. the proportion of ferrous Fe(II) ions to ferric Fe(III) ions), this increases the amount of both ferrous iron and ferric iron. Ferrous iron is a known absorber of infrared radiation and a typical ferrous level is approximately 25%. However, heat is absorbed at the expense of transmission of visible light, which may be reduced below a level which is acceptable for automotive purposes—in Europe there are currently legal requirements stipulating that, for example an automotive windscreen must have a visible light transmission greater than 75% (measured with CIE Illuminant A), and similar legislation exists elsewhere.

Further to this proposal, it has been suggested that for a given total iron content, the ferrous ratio should be modified to increase the proportion of ferrous iron in a glass so as to preferentially increase its heat absorbing capacity. To manufacture a higher ferrous glass (having a ferrous level of around 30% or above), reducing conditions in a glass melting furnace are required. One way of achieving these conditions is to add carbon to the batch ingredients. Unfortunately, with highly reducing conditions, sulphur (as sulphate) which is present in the batch ingredients as a refining aid, along with iron generates amber colouration in the glass (which reduces visible light transmission). Sulphates also react with the added carbon; this introduces silica faults (often observed as un-melted silica) into the glass, which is a severe manufacturing problem.

Furthermore, the resultant molten glass is so absorptive of heat that it is extremely difficult for any of the heat incident on the surface of the glass to penetrate into the glass body below. Such reduced thermal efficiency leads to a glass that is poorly melted and refined and thus of unacceptable quality.

EP 0 297 404 A1 describes a solution to these problems which involves redesigning a glass-melting furnace based on vacuum-refining techniques such that melting and refining of molten glass each occur in discrete, sequential stages. As one might imagine however, such a radical proposal is costly and complex to implement.

On the other hand, it has been proposed to shift the ferrous iron absorption band to longer wavelengths. In typical iron-containing glass, the major ferrous iron absorption band extends from around 550 to 1600 nm, and has its peak at around 1050 nm. The spectrum of visible light extends between 380 and 770 nm; the longer wavelength end of which is overlapped by the ferrous iron absorption band. By shifting the peak of this band to around 1150 nm, its overlap with the visible part of the spectrum is reduced, thus increasing the amount of visible light transmitted by a glass having a given iron content and ferrous level. To date, this appears to be one of the more popular routes to achieving a high performance glass, and there have been many proposals as to the exact manner in which it should be done.

Japanese Patent Publication 60-215546-A describes a glass which comprises typical glass constituents of silica, alumina, etc. along with baria (BaO). In its exemplary glasses, the amount of $SiO_2$ is less than 70%, $Al_2O_3$ less than 1.5%, CaO greater than 5% and MgO less than 2%. In addition these glasses contain high BaO (greater than 7%) and either typical $Na_2O$ levels (approximately 12-13%) but no $K_2O$, or reduced $Na_2O$ (approximately 6%) and high $K_2O$ (9-10%). The combination of reduction of the amount of MgO and inclusion of between 4 and 15% BaO are factors that shift the ferrous iron absorption band to longer wavelengths.

Unfortunately, such reduction (or complete removal) of MgO often leads to an increase in the liquidus temperature of the glass. The physical effect of this is an increase in highly undesirable occurrences of devitrification (when solid glass forms in the molten glass body in the working end of a glass-melting furnace). Not only does devitrification cause problems for the glass that is currently being melted in terms of its quality, it may also cause problems for the next glass to be melted because the different liquidus temperature of this next molten glass may permit re-melting of the devitrification, resulting in its contamination.

Furthermore, the combined effect of $Na_2O$ reduction and $K_2O$ increase often leads to other melting problems. $K_2O$ effectively "traps" carbon dioxide (a by-product of the batch ingredient melting reactions) in the molten glass, which can often be observed subsequently "erupting" from the surface of the melt, leading to unsatisfactory glass quality.

EP 0 629 179 A1 describes a glass comprising 69-75% $SiO_2$, 0-3% $Al_2O_3$, 2-10% CaO, 0-2% MgO, 9-17% $Na_2O$, 0-8% $K_2O$, 0.2-1.5% $Fe_2O_3$ and less than 4% BaO to achieve high performance and specifically an infrared absorption band with a peak situated at a wavelength greater than approximately 1100 nm. Similar melting problems due to low MgO (or its complete absence) and high $K_2O$ contents may again be observed. Furthermore in contradiction to the teaching of JP '546 above, in EP '179 inclusion of less than 4% BaO also appears to have the effect of shifting the ferrous iron absorption band to longer wavelengths.

SUMMARY OF THE INVENTION

It is therefore an object of the present invention to provide a high performance glass composition that does not suffer from the problems described above, and which in particular combines excellent physical properties with optimised melting performance for efficient manufacturing.

DETAILED DESCRIPTION OF THE INVENTION

Accordingly the present invention provides in a first aspect a flat glass composition comprising the following constituents, the amounts of which are expressed as percentages by weight:

| | |
|---|---|
| $SiO_2$ | 60-75% |
| $Al_2O_3$ | 0-5% |
| $Na_2O$ | 10-18% |
| $K_2O$ | 0-5.5% |
| CaO | 0-5% |
| MgO | 0-2% |
| $SO_3$ | 0-1% |
| $Fe_2O_3$ (total iron) | >0.01% |
| $TiO_2$ | 0-1% | and one or both of:

| | |
|---|---|
| SrO | 0-15% |
| BaO | 0-15% | with the proviso that the summed amount of SrO and BaO is greater than 4%.

Glass having such a composition indeed exhibits high performance characteristics when provided in a thickness of 5 mm or less. For a visible light transmission measured with Illuminant A ("$LT_A$") of greater than or equal to 70%, the glass has a direct solar heat transmission calculated according to ISO9050; AM 1.5 ("DSHT") of less than or equal to 41%, preferably less than or equal to 39%, at a thickness of 5 mm or less. When the visible light transmission of the glass reaches 75% and above, because the relationship of DSHT with $LT_A$ varies non-linearly, the glass has a DSHT of less than or equal to 48%, preferably less than or equal to 46% at a thickness of 5 mm or less.

A convenient way of comparing such glasses with prior art glasses, and with each other, is to consider a quantity known as "performance" which equates to $LT_A$ minus DSHT, for a given glass thickness. The performance of a high performance glass according to the invention, when provided in a thickness of 5 mm or less, is advantageously:

(a) greater than or equal to 29 and preferably around 31 for $LT_A$ greater than or equal to 70%, as compared to a typical green glass (having approximately 0.9% total iron) having a performance of 27 in a thickness of 5 mm or less;

(b) greater than or equal to 27 and preferably around 29 for $LT_A$ greater than or equal to 75%, as compared to a typical green glass (having approximately 0.56% total iron) having a performance of 26 in a thickness of 5 mm or less.

It is believed that the high performance characteristics are achieved by inter alia the combination of reduction of magnesia (MgO) and inclusion of strontia (SrO) and/or baria in the amounts stated, and the corresponding increase in the molar concentration of silica of at least three percentage points over the molar concentration found in standard float glass. These changes manifest as a shift (of approximately 100 nm) in the ferrous absorption band to longer wavelengths and an increase in the ferrous level of the glass, as is described in more detail below.

Importantly, in addition to its excellent optical properties, glasses having a composition according to the invention are easily melted and so may be efficiently manufactured. One factor that positively contributes to the excellent manufacturing properties of these glasses is the low liquidus temperature of the molten glass, which is preferably less than 980° C., more preferably less than 970° C. and most preferably less than 960° C. Surprisingly, inclusion of CaO, MgO, SrO and BaO in the relative amounts stated appears to lead to the low liquidus temperatures observed. The lower the liquidus temperature of a molten glass, the less likely it is that devitrification will occur.

Optimised melting performance permits attainment of higher ferrous levels—glasses according to the invention may have a ferrous level greater than 28%, preferably greater than 30% and most preferably between 35 and 40%, without the occurrence of bubbles and inclusions that may otherwise be observed in prior art glasses. It is thought that achievement of higher ferrous levels may also be attributed to the high soda level in combination with the amounts of BaO and/or SrO included in the glass composition.

Advantageously the summed amount of the alkaline earth metal oxide constituents (including MgO, CaO, SrO, BaO) may be in the range 10-20%, whilst the summed amount of the alkali metal oxide constituents (including $Na_2O$, $K_2O$) may also be in the range 10-20%. Satisfaction of these criteria appears useful in generation of the conditions for a high ferrous, high performance, easily-melted glass.

Preferably SrO may be present in an amount of less than 12%, more preferably less than 10% and most preferably less than 5%; similarly BaO may be present in an amount of 0.05-12% and more preferably 4-10%. The cost of these ingredients compared to the benefit each brings to the glass composition means that no more than 10% of each may preferably be present. However, a small amount of strontia (as low as 1-2%) in combination with at least 4% baria may provide an excellent glass.

CaO may be present in an amount less than or equal to 4.9%, preferably less than or equal to 4.8%. Reduction in the amount of CaO (over the amount found in standard float glass) appears to play an important role in determining the liquidus temperature of glasses according to the invention compared to prior art glasses, and so the amount should be carefully managed. Preferably CaO is present in an amount greater than 4.0%. Further surprisingly, the amount of CaO also seems to contribute to the high performance characteristics of the glasses.

Preferably MgO is present in an amount less than or equal to 1%, preferably less than or equal to 0.8% and most preferably in as small an amount as possible (less than 0.4% or even less than 0.2%). Ideally, magnesia may be completely absent from the glass composition, however in practice this may not be possible because of the necessity for quick transition times to other magnesia-containing glass compositions (which may be up to around 4.5%). A compromise may be reached by inclusion of magnesia at the levels described, typically less than 0.05%. It appears that reduction of MgO to these low levels, along with the other changes to the glass composition as compared to a standard clear glass, does not lead to the devitrification problems discussed earlier in relation to some prior art glasses.

$Na_2O$ (soda) may advantageously be present in an amount greater than or equal to 13.5%, preferably in the range 14 to 15% (around 14.5% being preferred). Soda is a fluxing agent which is used to promote melting reactions between the batch ingredients. If the amount in which it is present is too low, then melting is poor and the resultant glass may include bubbles and inclusions. If the amount is too high, durability of the glass may be poor as reactivity of the surface of the glass increases.

Preferably $K_2O$ (potassia) is present in an amount less than or equal to 3%, preferably less than or equal to 2%. Inclusion of potassia appears to contribute to shifting of the major ferrous iron band to longer wavelengths. Such levels may be beneficial in minimising the extent to which potassium silicates, discussed earlier, form in a glass. However an amount of $K_2O$ up to 1% may be unavoidable as potassium oxide is a component often found indigenous to sands that are used as a batch ingredient.

$TiO_2$ (titania) may advantageously be present to achieve a green-coloured glass (iron alone may result in more of a blue-green colour). $TiO_2$ may be present in an amount between 0.2% and 0.8% by weight, preferably around 0.6%.

In light of the foregoing, it may be preferable that the summed amount of the alkaline earth metal oxide constituents is in the range 10-15% and the summed amount of the alkali metal oxide constituents is in the range 13-17%. These ranges represent further optimisation of the properties (both physical and melting) of the glass composition.

As a further refinement of the invention, the flat glass composition may comprise the following constituents, the amounts of which are expressed as percentages by weight:

| | |
|---|---|
| $SiO_2$ | 65-74% |
| $Al_2O_3$ | 0-3% |
| $Na_2O$ | 13-16% |
| $K_2O$ | 0-2% |
| CaO | 1-4.9% |
| MgO | 0-2% |
| $SO_3$ | 0-1% |
| $Fe_2O_3$ (total iron) | >0.01% |
| $TiO_2$ | 0-1% |
| BaO | 4-10% |
| SrO | 0-5% | wherein the summed amount of the alkaline earth metal oxide constituents is in the range 10-13% and the summed amount of the alkali metal oxide constituents is in the range 14-16%.

Glasses according to the composition(s) described above may have a clear to blue-green tint depending on their exact total iron content and ferrous level. As used throughout this specification, total iron is expressed as if all iron present were present as ferric oxide ($Fe_2O_3$), as is known in the art. The ferrous level is determined chemically using molecular absorption spectrophotometry. The procedure for this is as follows:

finely grind a 1 g sample of a glass until the particle size is 100 μm or less transfer 0.5 g of the ground glass to a platinum crucible containing 20 ml deionised water, 2.5 ml phenanthroline hydrate solution (1% w/v), 8 ml hydrofluoric acid (40%) and 2 ml sulphuric acid (1:2 v/v)

stir to dissolve the ground glass then seal the crucible bubble carbon dioxide through the solution in the crucible for approximately 20 minutes add the contents of the crucible to 8 g of boric acid, swirl and allow to stand for 5 minutes adjust the pH of the solution to 3.2 by dropwise addition of ammonia solution dilute to a volume of 100 ml using deionised water filter the sample using a Perkin Elmer Lambda 20 UV/VIS spectrophotometer determine the amount of ferrous iron present in the sample by measuring the amount of the phenanthroline complex formed by it.

It is of course possible that compositions according to the invention may effectively be base glass compositions to which other colourants (in addition to iron) are added to achieve a blue, green-blue, grey or bronze tinted glass, to name just a few. Thus the glass composition may further comprise one or more of the following colouring agents: an oxide of cobalt, nickel, chromium, vanadium, manganese, copper, cerium, neodymium and erbium, and/or selenium (this being a non-exhaustive list). However such tinted compositions may not exhibit the high performance characteristics described earlier, although they will typically benefit from other advantageous features as described is this specification. It should also be noted that very small amounts (typically less than 0.2%) of any of these additives may be present in the base glass anyway as an impurity from the raw materials and/or the cullet used.

Especially when manufactured using the float process, the techniques for which are well-known in the art, glass according to the composition of the invention may conveniently be provided in annealed, sheet form. Typically a sheet of glass may be provided in a thickness between 0.5 and 10 mm, preferably between 1 and 5 mm. Said sheets may then be cut to the desired size and further processed as required. Such further processing may involve further cutting to achieve a shape that makes the glass suitable for use as an architectural window or an automotive window, bending of the glass to achieve a desired curvature, tempering of the glass to impart desired safety characteristics and/or joining one sheet of glass to another ply of material to create a composite glazing.

With regard to tempering the glass, the ease with which this may be done can be judged by the thermal expansion coefficient, $\alpha$, of the glass. Standard clear glass has $\alpha$ of approximately $90 \times 10^{-7}$ $cm^{-1}$ between 50 and 350° C., whereas glass according to the invention may have $\alpha$ greater than $100 \times 10^{-7}$ $cm^{-1}$ between 50 and 350° C., preferably around $102 \times 10^{-7}$ $cm^{-1}$ between 50 and 350° C. It is believed that the higher the content of soda in a glass composition, the higher the coefficient of thermal expansion of the glass, and the more easily the glass may be tempered. Beneficial toughening characteristics may lead to further production advantages as glass throughput on a tempering line may be increased.

Furthermore is appears that a higher coefficient of thermal expansion may allow for a reduction in the tempering temperature and/or a reduction in the quench pressure used to quench (cool) the hot glass and "fix" the desired compressive and tensile stresses into it. Moreover, glass of a composition according to the invention may be satisfactorily tempered when provided in thinner thickness (of 3 mm or less) using conventional tempering equipment and processes (where specialised equipment is currently required to temper such thin glasses of standard composition).

According to a second aspect of the invention there is provided a glazing comprising at least two sheets of glass spaced apart from one another, wherein one or more of the sheets of glass is of a composition as hereinbefore described.

The glazing may be in the form of a laminated glazing wherein two sheets of glass are separated by at least one ply of interlayer material, which joins the sheets together. Further plies of glass or other material may be joined to the laminate. Any known interlayer material such as polyvinyl butyral (PVB), polyvinyl chloride (PVC), polyurethane (PU), ethyl vinyl acetate (EVA), etc. may be used, and it may be clear or body-tinted.

Alternatively the glazing may be in the form of a multiple pane glazing unit wherein two sheets of glass are separated by a gaseous layer. The simplest form of such a unit is a double glazing unit, in which two sheets of glass are separated using spacers and the sealed space between them filled with an inert gas.

The overall thickness of such a glazing may be between 1.5 and 25 mm, preferably between 2 and 20 mm, and further preferably between 2.5 and 15 mm, depending on the number of plies used, and the thickness of the interlayer material/gaseous layer.

As briefly mentioned above, a glazing according to the invention may be used as an automotive window and as an architectural window, especially when in the form of a monolith, a laminated glazing or a multiple pane glazing unit. Automotive windows include windscreens, side windows, rear windows and sun roofs (covering a part or the whole of a vehicle roof), which may be bent and/or tempered. Architectural windows may be used both externally and internally of a building.

For a better understanding, the present invention will now be more particularly described by way of non-limiting examples.

Tables I(a) to I(f) and Table II on the following pages provide examples of glass samples having glass compositions according to the invention along with two comparative examples of prior art green glasses (Examples 1 and 46), all in 4 mm (±0.5 mm) thickness. Table I lists details of the measured/calculated compositions, ferrous levels, light transmissions, direct solar heat transmissions, liquidus temperatures and the primary phases. Table II lists details of viscosity temperatures, expansion coefficients, refractive indices and density for selected examples where the data is currently available.

Example 1 is a light-green glass containing 0.56% by weight total iron in a typical base glass composition; similarly Example 46 is a dark-green glass containing 0.90% by weight total iron. The base glass compositions for each of these Examples notably include approximately 13% soda, 8% calcia and 4% magnesia, and are devoid of strontia and baria. The ferrous level of these glasses is 25% (measured chemically, as described earlier), which is typical of glasses that are not described as "high ferrous", and the respective liquidus temperatures are 995° C. and 997° C. Other notable temperatures (in degrees Centigrade) which relate to the viscosity ($\eta$, measured in Poise) of glass are:

1) the melting temperature, quoted as $T \log_{10} 2.5$ and meaning the temperature at which $\log_{10} \eta = 2.5$, is that at which the glass batch ingredients melt quickly and the molten glass can be refined;
2) the working temperature, quoted as $T \log_{10} 4$ and meaning the temperature at which $\log_{10} \eta = 4$, is that at which a glass ribbon may be formed most easily on a tin bath during the float process from glass melted in a glass-melting furnace;
3) the softening temperature, quoted as $T \log_{10} 7.6$ and meaning the temperature at which $\log_{10} \eta = 7.6$, is that at which a sheet of glass ribbon will just deform under gravity;
4) the upper annealing temperature, quoted as $T \log_{10} 13.4$ and meaning the temperature at which $\log_{10} \eta = 13.4$, is the upper boundary of the range of temperatures at which a sheet of glass ribbon can be annealed.

Examples 2 to 7 and 11 to 45 and 47 to 82 are all glasses descriptive of the invention, whilst Examples 8, 9 and 10 illustrate the negative consequence of completely removing calcia on the liquidus temperature, which is raised compared to both Examples 1 and 46 meaning these three glasses are more difficult to manufacture.

Example glasses 2 to 7 and 11 to 45 (Set 1) are all to be compared with Example 1 because they all contain approximately the same amount of total iron as the glass of Example 1. All of these Set 1 glasses are higher performing glasses compared to Example 1, with their performance being at least 27 and often around 29 or 30 for a light transmission of 76%. Similarly, all have a higher ferrous level compared to Example 1, with the minimum ferrous level being 29% and often being around 35%.

Analysis of the compositions of the Set 1 glasses more closely shows that they all contain an increased total amount of alkali metal oxide compared to Example 1, which on the whole is due to an increased soda level, although sometimes it is due to an increased potassia level. Furthermore, all contain decreased calcia and magnesia levels compared to Example 1—calcia is typically decreased from around 8% to 4.7% whilst magnesia is typically decreased from 4% to around 0.02%—both being significant reductions. Moreover, all contain one or both of baria and strontia in significant amounts which are believed to lead to the higher performance and higher ferrous levels observed.

Apart from Examples 8 to 10 which exhibit increased liquidus temperatures compared to the glass of Example 1, those glasses of Set 1 for which the liquidus temperature has been determined all show a reduction compared to Example 1 to 980° C. or lower. The glass of Example 2 also shows a significant increase in its expansion coefficient compared to the glass of Example 1, meaning that it is much easier to toughen (see Table II). In addition, the glass of Example 2 has significantly reduced melting, working, softening and upper annealing temperatures compared to the glass of Example 1, meaning that less energy is required to manufacture the Example 2 glass, leading to a more efficient process overall. Furthermore, although the primary phase for the glass of Example 2 (like many other Set 1 glasses) is silica (whereas it is wollastonite for the prior art glasses of Examples 1 and 46), its lower liquidus temperature (964° C. compared to 995° C. and 997° C. for the glasses of Examples 1 and 46 respectively) should ensure very little devitrification.

Example glasses 47 to 82 (Set 2) are all to be compared with Example 46 because they all contain approximately the same amount of total iron as the glass of Example 46. All of these Set 2 glasses are higher performing glasses compared to Example 46, with their performance being at least 29 and often around 31 for a light transmission of 71%. Similarly, all (except Examples 54, 58, 59, 63, 65 and 76) have a higher ferrous level compared to Example 46, with the minimum ferrous level being 29% and often being above 35%.

Analysis of the compositions of the Set 2 glasses more closely shows that they all contain an increased total amount of alkali metal oxide compared to Example 46, which is due to an increased soda level. Furthermore, all contain decreased calcia and magnesia levels compared to Example 46—calcia is typically decreased from around 8% to 4.7% whilst magnesia is typically decreased from 4% to around 0.02%—both being significant reductions. Moreover, all contain one or both of baria and strontia in significant amounts which appear to lead to the higher performance and higher ferrous levels observed.

Example 47 for which the liquidus temperature has been determined shows a reduction compared to Example 46 to 965° C. The glass of Example 47 also shows a significant increase in its expansion coefficient compared to the glass of Example 46, meaning that it is much easier to toughen. Although its primary phase is silica (like with Example 2), its lower liquidus temperature should ensure very little devitrification.

TABLE I(a)

|  |  | 1 | 2 | 3 | 4 | 5 | 6 | 7 | 8 |
|---|---|---|---|---|---|---|---|---|---|
| $SiO_2$ | % by weight | 72.06 | 70.91 | 70.92 | 70.90 | 70.91 | 70.91 | 70.90 | 70.92 |
| $Al_2O_3$ |  | 1.06 | 1.11 | 1.11 | 1.11 | 1.11 | 1.11 | 1.12 | 1.11 |
| $Fe_2O_3$ |  | 0.56 | 0.56 | 0.56 | 0.56 | 0.56 | 0.56 | 0.56 | 0.56 |
| $Na_2O$ |  | 13.25 | 14.77 | 14.76 | 14.76 | 14.76 | 14.77 | 14.77 | 14.76 |
| $K_2O$ |  | 0.67 | 0.66 | 0.66 | 0.66 | 0.66 | 0.66 | 0.66 | 0.66 |
| CaO |  | 8.24 | 4.72 | 4.72 | 4.71 | 4.72 | 2.36 | 2.36 | 0.00 |
| MgO |  | 4.00 | 0.02 | 0.02 | 0.02 | 0.02 | 0.02 | 0.02 | 0.02 |
| SrO |  | 0.00 | 1.77 | 7.07 | 3.54 | 5.30 | 9.44 | 4.72 | 11.82 |
| $SO_3$ |  | 0.11 | 0.19 | 0.19 | 0.19 | 0.19 | 0.19 | 0.19 | 0.19 |
| $TiO_2$ |  | 0.00 | 0.00 | 0.00 | 0.00 | 0.00 | 0.00 | 0.00 | 0.00 |
| BaO |  | 0.00 | 5.27 | 0.00 | 3.54 | 1.77 | 0.00 | 4.72 | 0.00 |
| Σ Alkali Metal Oxides |  | 13.92 | 15.43 | 15.42 | 15.43 | 15.42 | 15.43 | 15.43 | 15.42 |
| Σ Alkali Earth Metal Oxides |  | 12.24 | 11.79 | 11.80 | 11.82 | 11.81 | 11.82 | 11.82 | 11.84 |
| Ferrous | % | 25 | 36 | 35 | 36 | 37 | 41 | 36 | 35 |
| $LT_A$ |  | 76.0 | 76.0 | 76.0 | 76.0 | 76.0 | 76.0 | 76.0 | 76.0 |
| DSHT |  | 50.0 | 45.7 | 46.9 | 46.5 | 46.7 | 46.1 | 45.4 | 45.8 |
| Performance |  | 26.0 | 30.3 | 29.1 | 29.5 | 29.3 | 29.9 | 30.6 | 30.2 |
| Liquidus Temperature | ° C. | 995 | 964 | 950 | 960 | 970 | 950 | 980 | 1008 |
| Primary Phase |  | wollastonite | silica | silica | silica | silica | silica | silica | silica |

|  |  | 9 | 10 | 11 | 12 | 13 | 14 | 15 |
|---|---|---|---|---|---|---|---|---|
| $SiO_2$ | % by weight | 70.90 | 70.91 | 70.91 | 70.91 | 70.91 | 70.90 | 70.92 |
| $Al_2O_3$ |  | 1.11 | 1.11 | 1.11 | 1.11 | 1.12 | 1.12 | 1.12 |
| $Fe_2O_3$ |  | 0.56 | 0.56 | 0.56 | 0.56 | 0.56 | 0.56 | 0.56 |
| $Na_2O$ |  | 14.76 | 14.76 | 14.77 | 14.77 | 14.77 | 14.77 | 14.77 |
| $K_2O$ |  | 0.66 | 0.66 | 0.66 | 0.67 | 0.67 | 0.67 | 0.67 |
| CaO |  | 0.00 | 0.00 | 4.72 | 4.72 | 4.72 | 4.72 | 2.36 |
| MgO |  | 0.02 | 0.02 | 0.02 | 0.02 | 0.02 | 0.02 | 0.02 |
| SrO |  | 0.00 | 5.91 | 1.17 | 0.57 | 0.17 | 0.00 | 0.00 |
| $SO_3$ |  | 0.19 | 0.19 | 0.20 | 0.20 | 0.20 | 0.20 | 0.19 |
| $TiO_2$ |  | 0.00 | 0.00 | 0.00 | 0.00 | 0.00 | 0.00 | 0.00 |
| BaO |  | 11.82 | 5.91 | 5.88 | 6.48 | 6.88 | 7.05 | 9.44 |
| Σ Alkali Metal Oxides |  | 15.43 | 15.42 | 15.43 | 15.43 | 15.44 | 15.44 | 15.44 |
| Σ Alkali Earth Metal Oxides |  | 11.84 | 11.84 | 11.79 | 11.79 | 11.79 | 11.79 | 11.82 |
| Ferrous | % | 29 | 29 | 38 | 37 | 37 | 37 | 40 |
| $LT_A$ |  | 76.0 | 76.0 | 76.0 | 76.0 | 76.0 | 76.0 | 76.0 |
| DSHT |  | 45.3 | 45.3 | 46.3 | 46.7 | 46.5 | 46.7 | 45.7 |
| Performance |  | 30.7 | 30.7 | 29.7 | 29.3 | 29.5 | 29.3 | 30.3 |
| Liquidus Temperature | ° C. | 1073 | 1018 | 945 | 970 | 977 | 970 |  |
| Primary Phase |  | silica | silica | silica | silica | silica | silica | silica |

TABLE I(b)

|  |  | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|
| $SiO_2$ | % by weight | 70.91 | 70.91 | 70.91 | 70.80 | 70.53 | 70.16 | 69.83 | 69.48 | 70.96 | 70.92 | 70.95 | 70.91 | 70.81 | 70.53 | 70.92 |
| $Al_2O_3$ |  | 1.11 | 1.11 | 1.11 | 1.11 | 1.11 | 1.10 | 1.10 | 1.10 | 1.11 | 1.11 | 1.11 | 1.11 | 1.11 | 1.11 | 1.11 |
| $Fe_2O_3$ |  | 0.56 | 0.56 | 0.56 | 0.54 | 0.55 | 0.56 | 0.56 | 0.55 | 0.55 | 0.55 | 0.55 | 0.55 | 0.55 | 0.54 | 0.55 |
| $Na_2O$ |  | 10.27 | 13.27 | 11.77 | 14.71 | 14.66 | 14.64 | 14.56 | 14.44 | 14.74 | 14.73 | 13.24 | 13.23 | 13.21 | 13.16 | 13.89 |
| $K_2O$ |  | 5.16 | 2.16 | 3.66 | 0.66 | 0.66 | 0.66 | 0.65 | 0.65 | 0.66 | 0.66 | 2.16 | 2.16 | 2.16 | 2.16 | 1.50 |
| CaO |  | 4.72 | 4.72 | 4.72 | 4.69 | 4.73 | 4.67 | 4.64 | 4.65 | 4.69 | 4.70 | 4.69 | 4.70 | 4.69 | 4.72 | 4.70 |
| MgO |  | 0.02 | 0.02 | 0.02 | 0.26 | 0.53 | 1.02 | 1.49 | 2.00 | 0.05 | 0.10 | 0.05 | 0.10 | 0.26 | 0.53 | 0.10 |
| SrO |  | 1.77 | 1.77 | 1.77 | 1.79 | 1.80 | 1.78 | 1.76 | 1.76 | 1.79 | 1.79 | 1.79 | 1.79 | 1.79 | 1.80 | 1.79 |
| $SO_3$ |  | 0.19 | 0.19 | 0.19 | 0.19 | 0.20 | 0.20 | 0.20 | 0.20 | 0.20 | 0.20 | 0.20 | 0.20 | 0.20 | 0.20 | 0.20 |
| $TiO_2$ |  | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| BaO |  | 5.27 | 5.27 | 5.30 | 5.24 | 5.24 | 5.20 | 5.21 | 5.14 | 5.25 | 5.25 | 5.24 | 5.24 | 5.23 | 5.24 | 5.24 |
| Σ Alkali Metal Oxides |  | 15.43 | 15.43 | 15.43 | 15.37 | 15.32 | 15.30 | 15.21 | 15.10 | 15.40 | 15.39 | 15.40 | 15.39 | 15.37 | 15.32 | 15.38 |
| Σ Alkali Earth Metal Oxides |  | 11.79 | 11.79 | 11.80 | 11.97 | 12.30 | 12.68 | 13.11 | 13.54 | 11.78 | 11.83 | 11.78 | 11.83 | 11.97 | 12.30 | 11.83 |
| Ferrous | % | 37 | 37 | 38 | 38 | 40 | 39 | 39 | 40 | 40 | 38 | 37 | 37 | 36 | 39 | 37 |
| $LT_A$ |  | 76.0 | 76.0 | 76.0 | 76.0 | 76.0 | 76.0 | 76.0 | 76.0 | 76.0 | 76.0 | 76.0 | 76.0 | 76.0 | 76.0 | 76.0 |
| DSHT |  | 45.6 | 45.8 | 45.5 | 46.6 | 46.8 | 47.2 | 47.7 | 48.1 | 46.4 | 46.5 | 46.0 | 46.2 | 46.3 | 46.5 | 46.2 |
| Performance |  | 30.4 | 30.2 | 30.5 | 29.4 | 29.2 | 28.8 | 28.3 | 27.9 | 29.6 | 29.5 | 30.0 | 29.8 | 29.7 | 29.5 | 29.8 |
| Liquidus Temperature | °C. |  |  |  |  |  |  |  |  |  |  |  |  |  |  |  |
| Primary Phase |  | silica | silica | silica | silica | silica |  |  |  |  |  |  |  |  |  |  |

TABLE I(c)

|  |  | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|---|
| $SiO_2$ | % by weight | 70.92 | 70.91 | 70.91 | 70.91 | 70.91 | 70.90 | 70.72 | 70.90 | 70.91 | 71.13 | 70.91 | 72.50 | 72.51 | 72.54 | 72.16 |
| $Al_2O_3$ |  | 1.11 | 1.11 | 1.11 | 1.11 | 1.12 | 1.12 | 1.11 | 1.11 | 1.11 | 1.12 | 1.11 | 1.14 | 1.14 | 1.13 | 1.13 |
| $Fe_2O_3$ |  | 0.55 | 0.55 | 0.56 | 0.56 | 0.56 | 0.56 | 0.56 | 0.56 | 0.56 | 0.56 | 0.56 | 0.56 | 0.56 | 0.56 | 0.56 |
| $Na_2O$ |  | 14.39 | 13.39 | 14.77 | 14.77 | 14.77 | 14.77 | 14.78 | 14.78 | 14.78 | 14.76 | 14.78 | 14.77 | 14.78 | 14.77 | 14.70 |
| $K_2O$ |  | 1.00 | 2.00 | 0.66 | 0.67 | 0.67 | 0.67 | 0.66 | 0.66 | 0.66 | 0.67 | 0.66 | 0.68 | 0.68 | 0.67 | 0.68 |
| CaO |  | 4.70 | 4.70 | 4.72 | 4.72 | 4.72 | 4.72 | 4.50 | 4.50 | 4.32 | 4.50 | 4.50 | 4.50 | 4.00 | 4.00 | 3.98 |
| MgO |  | 0.10 | 0.10 | 0.02 | 0.02 | 0.02 | 0.02 | 0.02 | 0.02 | 0.02 | 0.02 | 0.02 | 0.02 | 0.01 | 0.01 | 0.01 |
| SrO |  | 1.79 | 1.79 | 1.17 | 0.57 | 0.17 | 0.00 | 1.18 | 1.15 | 1.17 | 1.17 | 1.21 | 0.94 | 0.00 | 6.14 | 0.00 |
| $SO_3$ |  | 0.20 | 0.20 | 0.20 | 0.20 | 0.20 | 0.20 | 0.19 | 0.19 | 0.19 | 0.19 | 0.19 | 0.18 | 0.18 | 0.18 | 0.18 |
| $TiO_2$ |  | 0.00 | 0.00 | 0.00 | 0.00 | 0.00 | 0.00 | 0.40 | 0.40 | 0.40 | 0.00 | 0.00 | 0.00 | 0.00 | 0.00 | 0.00 |
| BaO |  | 5.24 | 5.24 | 5.88 | 6.48 | 6.88 | 7.05 | 5.89 | 5.73 | 5.88 | 5.88 | 6.06 | 4.71 | 6.14 | 0.00 | 6.60 |
| Σ Alkali Metal Oxides |  | 15.38 | 15.39 | 15.43 | 15.43 | 15.44 | 15.44 | 15.44 | 15.44 | 15.44 | 15.43 | 15.44 | 15.45 | 15.46 | 15.44 | 15.38 |
| Σ Alkali Earth Metal Oxides |  | 11.83 | 11.83 | 11.79 | 11.79 | 11.79 | 11.79 | 11.58 | 11.40 | 11.39 | 11.57 | 11.79 | 10.17 | 10.15 | 10.16 | 10.59 |
| Ferrous | % | 37 | 38 | 37 | 36 | 37 | 36 | 36 | 37 | 37 | 36 | 39 | 43 | 41 | 40 | 36 |
| $LT_A$ |  | 76.0 | 76.0 | 76.0 | 76.0 | 76.0 | 76.0 | 76.0 | 76.0 | 76.0 | 76.0 | 76.0 | 76.0 | 76.0 | 76.0 | 76.0 |
| DSHT |  | 46.3 | 46.2 | 46.5 | 45.9 | 45.8 | 45.7 | 46.4 | 46.5 | 46.4 | 46.1 | 46.1 | 45.7 | 45.8 | 46.5 | 46.0 |
| Performance |  | 29.7 | 29.8 | 29.5 | 30.1 | 30.3 | 30.3 | 29.6 | 29.5 | 29.6 | 29.9 | 29.9 | 30.3 | 30.2 | 29.5 | 30.0 |
| Liquidus Temperature | °C. |  |  | 945 | 970 | 977 | 970 |  |  |  |  |  |  |  |  |  |
| Primary Phase |  |  |  | silica | silica | silica | silica |  |  |  |  |  |  |  |  |  |

TABLE I(d)

|  |  | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|
| $SiO_2$ | % by weight | 72.09 | 70.59 | 70.59 | 70.59 | 70.59 | 70.55 | 70.55 | 70.55 | 70.59 | 70.72 | 70.72 | 70.72 | 70.22 | 70.91 | 70.60 |
| $Al_2O_3$ |  | 1.06 | 1.11 | 1.11 | 1.11 | 1.11 | 1.11 | 1.11 | 1.11 | 1.11 | 1.11 | 1.11 | 1.11 | 1.11 | 1.11 | 1.11 |
| $Fe_2O_3$ |  | 0.90 | 0.85 | 0.85 | 0.85 | 0.85 | 0.90 | 0.90 | 0.90 | 0.85 | 0.72 | 0.72 | 0.72 | 1.23 | 0.56 | 0.85 |
| $Na_2O$ |  | 13.25 | 14.81 | 14.81 | 14.81 | 14.81 | 14.80 | 14.80 | 14.80 | 14.81 | 14.84 | 14.84 | 14.84 | 14.79 | 14.77 | 14.81 |
| $K_2O$ |  | 0.67 | 0.66 | 0.66 | 0.66 | 0.66 | 0.66 | 0.66 | 0.66 | 0.66 | 0.66 | 0.66 | 0.66 | 0.66 | 0.66 | 0.66 |

TABLE I(d)-continued

| | | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|
| CaO | | 7.89 | 4.73 | 4.73 | 4.73 | 4.73 | 4.72 | 4.72 | 4.72 | 4.73 | 4.70 | 4.70 | 4.70 | 4.72 | 4.72 | 4.73 |
| MgO | | 4.00 | 0.02 | 0.02 | 0.02 | 0.02 | 0.02 | 0.02 | 0.02 | 0.02 | 0.02 | 0.02 | 0.02 | 0.02 | 0.02 | 0.02 |
| SrO | | 0.00 | 1.76 | 1.76 | 1.76 | 1.76 | 1.76 | 1.76 | 1.76 | 1.76 | 1.76 | 1.76 | 1.76 | 1.76 | 1.77 | 3.54 |
| $SO_3$ | | 0.11 | 0.19 | 0.19 | 0.19 | 0.19 | 0.19 | 0.19 | 0.19 | 0.19 | 0.19 | 0.19 | 0.19 | 0.19 | 0.19 | 0.19 |
| $TiO_2$ | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| BaO | | 0.00 | 5.28 | 5.28 | 5.28 | 5.28 | 5.27 | 5.27 | 5.27 | 5.28 | 5.27 | 5.27 | 5.27 | 5.30 | 5.27 | 3.50 |
| Σ Alkali Metal Oxides | | 13.92 | 15.47 | 15.47 | 15.47 | 15.47 | 15.46 | 15.46 | 15.46 | 15.47 | 15.50 | 15.50 | 15.50 | 15.45 | 15.43 | 15.47 |
| Σ Alkali Earth Metal Oxides | | 11.89 | 11.78 | 11.78 | 11.78 | 11.78 | 11.78 | 11.78 | 11.78 | 11.78 | 11.75 | 11.75 | 11.75 | 11.80 | 11.79 | 11.79 |
| Ferrous | % | 25 | 37 | 42 | 33 | 46 | 36 | 50 | 45 | 23 | 33 | 38 | 41 | 19 | 22 | 36 |
| $LT_A$ | | 71.0 | 71.0 | 71.0 | 71.0 | 71.0 | 71.0 | 71.0 | 71.0 | 71.0 | 71.0 | 71.0 | 71.0 | 71.0 | 71.0 | 71.0 |
| DSHT | | 43.9 | 39.9 | 39.6 | 40.3 | 39.3 | 40.3 | 39.6 | 39.4 | 40.5 | 40.4 | 41.4 | 41.5 | 44.3 | 41.9 | 40.1 |
| Performance | | 27.1 | 31.1 | 31.4 | 30.7 | 31.7 | 30.7 | 31.4 | 31.6 | 30.5 | 30.6 | 29.6 | 29.5 | 26.7 | 29.1 | 30.9 |
| Liquidus Temperature | ° C. | 997 | 965 | 965 | 965 | 965 | | | | 965 | | | | | | |
| Primary Phase | | wollastonite | silica | silica | silica | silica | | | | silica | | | | | | |

TABLE I(e)

| | | 61 | 62 | 63 | 64 | 65 | 66 | 67 | 68 | 69 | 70 | 71 | 72 | 73 | 74 | 75 |
|---|---|---|---|---|---|---|---|---|---|---|---|---|---|---|---|---|
| $SiO_2$ | % by weight | 70.59 | 70.60 | 70.30 | 70.61 | 70.31 | 70.52 | 70.45 | 70.31 | 70.24 | 70.54 | 70.58 | 70.17 | 70.48 | 70.59 | 70.56 |
| $Al_2O_3$ | | 1.11 | 1.10 | 1.11 | 1.11 | 1.11 | 1.11 | 1.11 | 1.11 | 1.10 | 1.11 | 1.11 | 1.10 | 1.11 | 1.11 | 1.11 |
| $Fe_2O_3$ | | 0.85 | 0.85 | 1.15 | 0.85 | 1.15 | 0.85 | 0.85 | 0.84 | 0.84 | 0.85 | 0.85 | 0.84 | 0.85 | 0.85 | 0.85 |
| $Na_2O$ | | 14.82 | 14.82 | 14.79 | 14.77 | 14.79 | 14.80 | 14.78 | 14.75 | 14.74 | 14.80 | 14.81 | 14.72 | 14.79 | 14.81 | 14.81 |
| $K_2O$ | | 0.66 | 0.65 | 0.66 | 0.66 | 0.66 | 0.66 | 0.66 | 0.66 | 0.66 | 0.66 | 0.66 | 0.66 | 0.66 | 0.66 | 0.66 |
| CaO | | 4.73 | 4.73 | 4.72 | 4.72 | 4.72 | 4.72 | 4.72 | 4.71 | 4.70 | 4.72 | 4.73 | 4.70 | 4.72 | 4.33 | 4.72 |
| MgO | | 0.02 | 0.02 | 0.02 | 0.02 | 0.02 | 0.02 | 0.02 | 0.02 | 0.02 | 0.02 | 0.02 | 0.02 | 0.02 | 0.02 | 0.02 |
| SrO | | 5.27 | 7.04 | 1.76 | 1.17 | 1.17 | 1.76 | 1.76 | 1.75 | 1.75 | 1.76 | 1.76 | 1.75 | 1.76 | 1.76 | 1.76 |
| $SO_3$ | | 0.19 | 0.19 | 0.19 | 0.20 | 0.20 | 0.19 | 0.19 | 0.19 | 0.19 | 0.19 | 0.19 | 0.19 | 0.19 | 0.19 | 0.19 |
| $TiO_2$ | | 0.00 | 0.00 | 0.00 | 0.00 | 0.00 | 0.10 | 0.20 | 0.40 | 0.50 | 0.07 | 0.02 | 0.60 | 0.15 | 0.40 | 0.05 |
| BaO | | 1.77 | 0.00 | 5.30 | 5.88 | 5.88 | 5.27 | 5.27 | 5.26 | 5.25 | 5.27 | 5.28 | 5.25 | 5.27 | 5.28 | 5.27 |
| Σ Alkali Metal Oxides | | 15.47 | 15.47 | 15.44 | 15.44 | 15.45 | 15.46 | 15.44 | 15.41 | 15.40 | 15.46 | 15.47 | 15.38 | 15.45 | 15.47 | 15.47 |
| Σ Alkali Earth Metal Oxides | | 11.79 | 11.79 | 11.80 | 11.79 | 11.79 | 11.77 | 11.76 | 11.74 | 11.72 | 11.78 | 11.78 | 11.71 | 11.77 | 11.38 | 11.78 |
| Ferrous | % | 35 | 36 | 25 | 35 | 23 | 35 | 37 | 36 | 37 | 38 | 37 | 37 | 35 | 40 | 35 |
| $LT_A$ | | 71.0 | 71.0 | 71.0 | 71.0 | 71.0 | 71.0 | 71.0 | 71.0 | 71.0 | 71.0 | 71.0 | 71.0 | 71.0 | 71.0 | 71.0 |
| DSHT | | 40.5 | 40.5 | 41.8 | 39.8 | 41.4 | 40.0 | 39.9 | 40.0 | 40.0 | 39.8 | 39.8 | 40.0 | 41.1 | 39.8 | 40.0 |
| Performance | | 30.5 | 30.5 | 29.2 | 31.2 | 29.6 | 31.0 | 31.1 | 31.0 | 31.0 | 31.2 | 31.2 | 31.0 | 29.9 | 31.2 | 31.0 |
| Liquidus Temperature | ° C. | | | | | | | | | | | | | | | |
| Primary Phase | | | | | | | | | | | | | | | | |

TABLE I(f)

| | | 76 | 77 | 78 | 79 | 80 | 81 | 82 |
|---|---|---|---|---|---|---|---|---|
| $SiO_2$ | % by weight | 70.03 | 70.17 | 70.59 | 70.17 | 70.17 | 70.40 | 70.57 |
| $Al_2O_3$ | | 1.10 | 1.10 | 1.11 | 1.11 | 1.11 | 1.11 | 1.11 |
| $Fe_2O_3$ | | 1.15 | 0.84 | 0.85 | 0.84 | 0.84 | 0.84 | 0.84 |
| $Na_2O$ | | 14.73 | 14.72 | 14.81 | 14.72 | 14.73 | 14.71 | 14.71 |
| $K_2O$ | | 0.66 | 0.66 | 0.66 | 0.66 | 0.66 | 0.66 | 0.66 |
| CaO | | 4.70 | 4.70 | 4.13 | 4.70 | 4.47 | 4.47 | 4.47 |
| MgO | | 0.02 | 0.02 | 0.02 | 0.02 | 0.02 | 0.02 | 0.02 |
| SrO | | 1.75 | 1.75 | 1.76 | 0.00 | 0.00 | 0.00 | 0.00 |
| $SO_3$ | | 0.19 | 0.19 | 0.19 | 0.19 | 0.19 | 0.19 | 0.19 |
| $TiO_2$ | | 0.40 | 0.60 | 0.60 | 0.60 | 0.60 | 0.60 | 0.60 |

TABLE I(f)-continued

|  |  | 76 | 77 | 78 | 79 | 80 | 81 | 82 |
|---|---|---|---|---|---|---|---|---|
| BaO |  | 5.28 | 5.25 | 5.28 | 7.00 | 7.21 | 7.00 | 6.82 |
| Σ Alkali Metal Oxides |  | 15.38 | 15.38 | 15.47 | 15.38 | 15.39 | 15.37 | 15.37 |
| Σ Alkali Earth Metal Oxides |  | 11.75 | 11.71 | 11.19 | 11.71 | 11.70 | 11.49 | 11.31 |
| Ferrous | % | 24 | 37 | 32 | 35 | 36 | 29 | 37 |
| $LT_A$ |  | 71.0 | 71.0 | 71.0 | 71.0 | 71.0 | 71.0 | 71.0 |
| DSHT |  | 41.3 | 39.9 | 40.0 | 39.8 | 39.8 | 39.9 | 39.8 |
| Performance |  | 29.7 | 31.1 | 31.0 | 31.2 | 31.2 | 31.1 | 31.2 |
| Liquidus Temperature | °C. |  |  |  | 958 | 957 | 975 | 985 |
| Primary Phase |  |  |  |  | silica | silica | silica | silica |

TABLE II

|  |  | 1 | 2 | 46 | 47 | 63 | 79 | 80 | 81 |
|---|---|---|---|---|---|---|---|---|---|
| T $\log_{10}$ 2.5 | °C. | 1316 | 1285 | 1320 | 1278 | 1272 |  |  |  |
| T $\log_{10}$ 4 |  | 1027 | 988 | 1029 | 991 | 985 |  |  |  |
| T $\log_{10}$ 7.6 |  | 725 | 684 | 725 | 689 | 686 |  |  |  |
| T $\log_{10}$ 13.4 |  | 550 | 509 | 549 | 509 | 518 |  |  |  |
| Expansion Coefficient | $\times 10^{-7}$ cm$^{-1}$ over 50-350° C. | 90.6 | 102.2 | 90.2 | 102.0 |  |  |  |  |
| Refractive Index |  | 1.5194 | 1.5182 | 1.5195 | 1.5190 | 1.5202 | 1.5222 | 1.5228 | 1.5222 |
| Density | g cm$^{-3}$ | 2.5079 | 2.5736 | 2.5074 | 2.5779 | 2.5853 | 2.5919 | 2.5971 | 2.5910 |

The invention claimed is:

1. A float glass composition comprising the following constituents, the amounts of which are expressed as percentages by weight:

| $SiO_2$ | 60-75% |
|---|---|
| $Al_2O_3$ | 0-5% |
| $Na_2O$ | 13-18% |
| $K_2O$ | 0-5.5% |
| CaO | 0-4.9% |
| MgO | 0-1% |
| $SO_3$ | 0-1% |
| $Fe_2O_3$ (total iron) | >0.01% |
| $TiO_2$ | 0-1% | and one or both of:

| SrO | 0-10% |
|---|---|
| BaO | 4-10% | with the proviso that the summed amount of SrO and BaO is greater than 4%, and further wherein the performance exhibited by the glass of the composition is:
(a) greater than or equal to 29 at $LT_A$ greater than or equal to 70%, and
(b) greater than or equal to 27 at $LT_A$ greater than or equal to 75%, for glasses having a thickness of 5 mm or less.

2. The float glass composition as claimed in claim 1, wherein the summed amount of the alkaline earth metal constituents is in the range 10-20%.

3. The float glass composition as claimed in claim 1, wherein the summed amount of the alkali metal constituents is in the range 10-20%.

4. The float glass composition as claimed in claim 1, wherein the ferrous level is greater than or equal to 28%.

5. The float glass composition as claimed in claim 1, wherein the liquidus temperature is less than or equal to 980° C.

6. The float glass composition as claimed in claim 1, wherein CaO is present in an amount less than or equal to 4.8%.

7. The float glass composition as claimed in claim 1, wherein MgO is present in an amount less than or equal to 0.8%.

8. The float glass composition as claimed in claim 1, wherein $Na_2O$ is present in an amount greater than or equal to 14%.

9. The float glass composition as claimed in claim 1, wherein $K_2O$ is present in an amount less than or equal to 3%.

10. The float glass composition as claimed in claim 1, wherein $K_2O$ is present in an amount less than or equal to 2%.

11. The float glass composition as claimed in claim 1, wherein the summed amount of the alkaline earth metal constituents is in the range 10-15%.

12. The float glass composition as claimed in any of claim 1, wherein the summed amount of the alkali metal constituents is in the range 13-17%.

13. The float glass composition as claimed in claim 1, further comprising one or more of the following coloring agents: oxides of cobalt, nickel, chromium, vanadium, manganese, copper, cerium, neodymium and erbium, and selenium.

14. The float glass in sheet form of a composition as claimed in claim 1.

15. A glazing comprising at least two sheets of glass spaced apart from one another, wherein one or more of the sheets of glass is as claimed in claim 14.

16. The glazing as claimed in claim 15, in the form of a laminated glazing wherein two sheets of glass are separated by at least one ply of interlayer material, which joins the sheets together.

17. The glazing as claimed in claim 15, in the form of a multiple pane glazing unit wherein two sheets of glass are separated by a gaseous layer.

18. A method of making a monolithic automotive window utilizing a glass in sheet form as claimed in claim 14.

19. A method of making a toughened automotive window utilizing glass in sheet form as claimed in claim 18.

20. The float glass as claimed in claim 1, having a thermal expansion coefficient, α, greater than $100 \times 10^{-7}$ cm$^{-1}$ between 50 and 350° C.

21. A float glass composition comprising the following constituents, the amounts of which are expressed as percentages by weight:

| | |
|---|---|
| $SiO_2$ | 65-74% |
| $Al_2O_3$ | 0-3% |
| $Na_2O$ | 13-16% |
| $K_2O$ | 0-2% |
| CaO | 1-4.9% |
| MgO | 0-1% |
| $SO_3$ | 0-1% |
| $Fe_2O_3$ (total iron) | >0.01% |
| $TiO_2$ | 0-1% |
| BaO | 4-10% |
| SrO | 0-5% | wherein the summed amount of the alkaline earth metal constituents is in the range 10-13% and the summed amount of the alkali metal constituents is in the range 14-16%, and further wherein the performance exhibited by the glass of the composition is:

(a) greater than or equal to 29 $LT_A$ at greater than or equal to 70%, and (b) greater than or equal to 27 at $LT_A$ at greater than or equal to 75%, for glasses having a thickness of 5 mm or less.

* * * * *

UNITED STATES PATENT AND TRADEMARK OFFICE
CERTIFICATE OF CORRECTION

PATENT NO. : 8,461,070 B2
APPLICATION NO. : 12/450385
DATED : June 11, 2013
INVENTOR(S) : John Buckett et al.

Page 1 of 1

It is certified that error appears in the above-identified patent and that said Letters Patent is hereby corrected as shown below:

In the Claims

Claim 12, column 16, line 58, replace "as claimed in any of claim" with
-- as claimed in claim --.

Claim 21, column 18, line 20, replace "equal to 29 $LT_A$ at greater" with
-- equal to 29 at $LT_A$ greater --.

Claim 21, column 18, line 23, replace "equal to 27 at $LT_A$ at greater" with
-- equal to 27 at $LT_A$ greater --.

Signed and Sealed this
Twenty-seventh Day of August, 2013

Teresa Stanek Rea
*Acting Director of the United States Patent and Trademark Office*